UNITED STATES PATENT OFFICE.

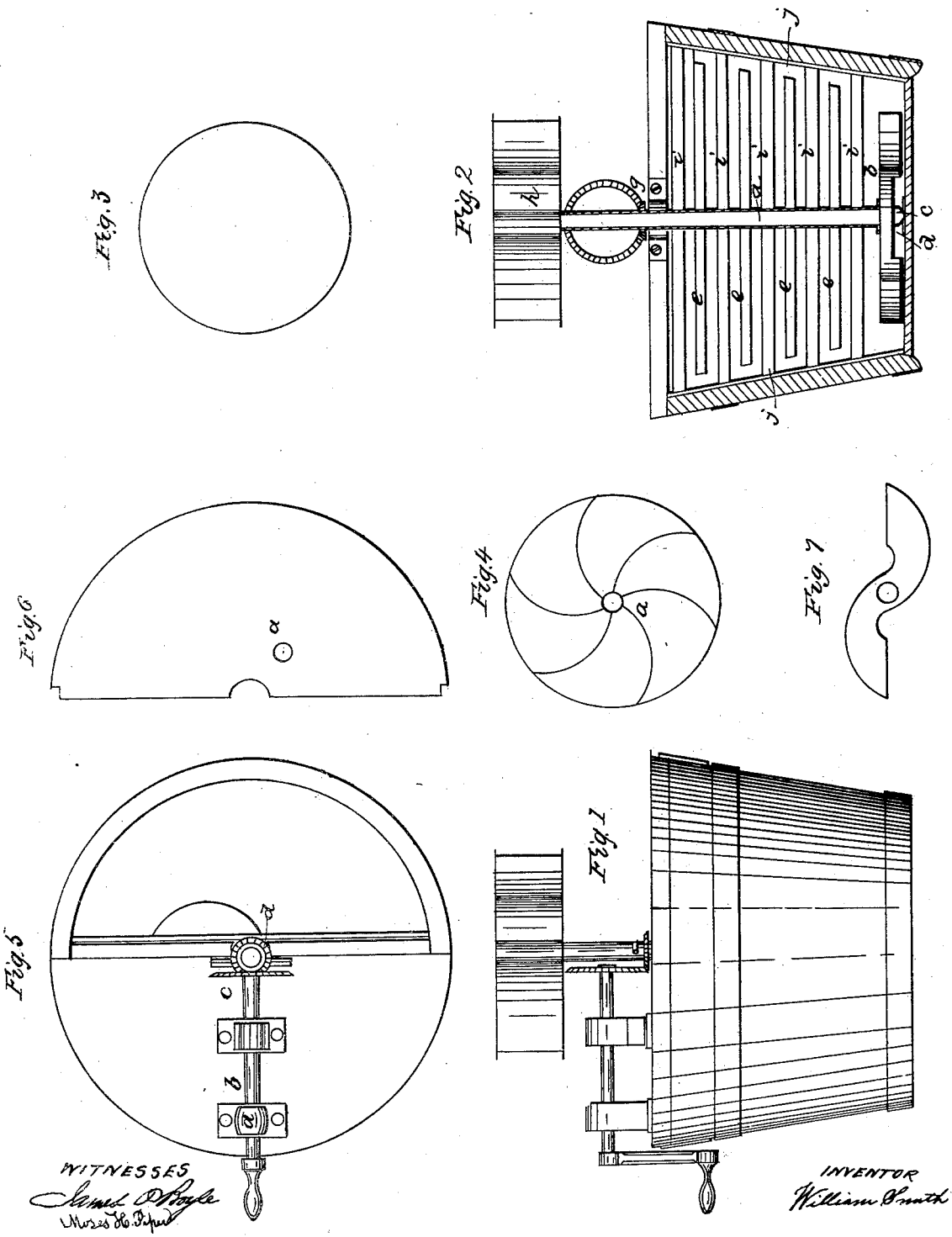

W. S. HALL, OF QUINCY, MASSACHUSETTS.

CHURN.

Specification of Letters Patent No. 24,934, dated August 2, 1859.

*To all whom it may concern:*

Be it known that I, WILLIAM SMITH HALL, of Quincy, in the county Norfolk, in the State of Massachusetts, have invented a new and useful Improved Churn for Making Butter, called the "Atmospheric Combination-Churn;" and I do hereby declare that the following is a full and exact description of the construction and operation of the same, reference being had to the accompanying drawings and the letters of reference marked thereon.

Figure 1, is an external view of the churn. Fig. 2, is a transverse section. Fig. 3, is a plan or top view of rotary fan. Fig. 4, is a plan of under side of rotary fan. Fig. 5, is a plan of cover of churn. Fig. 6, is a section of cover. Fig. 7, is a longitudinal view of hollow arm or paddle.

In an upright tub or box (Fig. 2) I place a perpendicular hollow shaft (*a*). The bottom of the shaft is inserted into the center of a horizontal hollow arm or paddle (*b*). On the under side of the hollow arm or paddle is attached a point or bearing (*c*) that is inserted the cup (*d*). Between this hollow arm or paddle and the top of the tub, I attach to the perpendicular shaft at regular distances several horizontal solid arms or paddles (*e, e, e, e,*). Above these arms and at the cover is a journal box (*f*) for the upright shaft to run in. Above the cover of the tub a small gear wheel or pinion (*g*) is attached to the hollow shaft. On the top of the hollow shaft attached thereto by a screw is a rotary fan (*h*). By the side of the hollow shaft, but not connected with it, I place a series of transverse stationary bars (*i, i, i, i,*) the ends of which are attached to the upright bars (*j j*) so that they can all be taken out or put in together. These transverse bars are placed in such a position that when the hollow shaft turns around the arms or paddles attached to the shaft will pass between the bars.

On the cover of the churn (Fig. 5) is placed a chair or journal box (*a*) through which is inserted a crank shaft (*b,*). On the end of the crank shaft is a driving gear wheel (*c*) three times the diameter of the pinion (*d*) in which it works.

The rotary fan (Figs. 3 and 4) is constructed of two circular pieces of tin. Between these and radiating from the center are curved arms (Fig. 4, *a*) curving from right to left. The hollow arm or paddle (Fig. 7) is constructed of wood or metal. It is formed of two segments of a circle placed opposite each other and radiating from a common center. The faces or openings are straight and on opposite sides.

Fig. 6, is a section of the cover in which is an opening (*a*) for the air to escape.

By a rapid rotary motion of the hollow shaft from right to left, which is produced by the driving wheel being three times the size of the pinion, the air is forced into the fan down through the hollow shaft, while the curve of the hollow arm or paddle at the bottom of the shaft being in an opposite direction from the arms of the fan, a vacuum is created, which allows the air to be discharged, causing a vertical action on the milk or cream, the solid arms or paddles attached to the hollow shaft, giving the milk or cream at the same time a rotary motion, propelling it with great force against the stationary transverse bars. The stationary transverse bars sufficiently retard the rotary motion of the milk or cream to permit the rotary arms or paddles to pass through the milk or cream so as to cause a more thorough separation, than could be done if the milk or cream rotated as rapidly as the arms or paddles.

The combined action produced by the current of air, the rotary paddles, and the stationary bars, cause a thorough agitation of every part of the milk or cream at the same time, making a more speedy and complete separation of the butter from the milk or cream, and producing more butter, in less time and with less labor than can be done with any churn heretofore used.

What I claim as my invention and desire to secure by Letters Patent, is—

The manner of forcing a current of air through the milk or cream by the application of the rotary fan, combined with the upright hollow shaft, the rotary hollow and solid arms or paddles, and the stationary transverse bars, as herein specifically described, thereby causing a thorough agitation of every part of the milk or cream at the same time, making a more speedy and complete separation of the butter from the milk or cream, and producing more butter with less labor and in less time than can be done with any churn heretofore used.

WILLIAM SMITH HALL. [L. S.]

Witnesses:
JAMES O. BOYLE,
MOSES H. PIPER.